United States Patent [19]

Richardson, Jr.

[11] 4,441,143

[45] Apr. 3, 1984

[54] PHOTO VOLTAIC LIGHTING FOR OUTDOOR TELEPHONE BOOTH

[75] Inventor: Charles T. Richardson, Jr., Norcross, Ga.

[73] Assignee: Gladwin, Inc., Oakwood, Ga.

[21] Appl. No.: 346,272

[22] Filed: Feb. 5, 1982

Related U.S. Application Data

[63] Continuation-in-part of Ser. No. 177,243, Aug. 11, 1980, abandoned.

[51] Int. Cl.³ .................................................. F21L 7/00
[52] U.S. Cl. ....................................... 362/183; 362/20; 362/145; 362/147; 362/184; 362/190; 362/216; 362/217; 362/225; 362/228; 362/276; 362/376; 362/812
[58] Field of Search ................. 362/20, 145, 147, 183, 362/216, 217, 225, 276, 228, 184, 190, 376, 812

[56] References Cited

U.S. PATENT DOCUMENTS

| | | | |
|---|---|---|---|
| 2,881,306 | 4/1959 | Sherron | 362/147 |
| 4,281,369 | 7/1981 | Batte | 362/183 |
| 4,319,310 | 3/1982 | Kingsley | 362/812 |

*Primary Examiner*—Stephen J. Lechert, Jr.

*Attorney, Agent, or Firm*—O'Neil and Bean

[57] ABSTRACT

A free standing outdoor telephone booth is provided with a photo voltaic (PV) array, one or more rechargeable storage batteries and electrical control circuit which includes a temperature compensated control for limiting the supply of electrical energy from the PV array to the rechargeable battery to avoid over charging the battery, an ambient light (solar insolation) sensing circuit for controlling the electrical lamp load, to turn the lamp ON during dark ambient and OFF during light ambient conditions. In addition, the total discharge limit of the storage battery is controlled to a safe operating limit and a means is disclosed to power a fluorescent lamp at energy conserving intensities with energy derived from the rechargeable storage battery. The lamp control circuitry is preferably constituted by a high frequency power inverter with regulated output power to energize a low wattage fluorescent lamp and to dim the fluorescent lamp when the telephone is not in use. The PV array may be mounted in the roof of the booth, or may be mounted remotely or on adjacent structure on poles disguised as phone signs. Multiple commercially available PV arrays and storage batteries may be connected electrically in parallel to provide higher reliability and/or greater electrical energy capacity.

6 Claims, 6 Drawing Figures

PHOTO VOLTAIC LIGHTING FOR OUTDOOR TELEPHONE BOOTH

This application is a continuation-in-part of copending application Ser. No. 177,243, filed Aug. 11, 1980, now abandoned.

BACKGROUND AND BRIEF DESCRIPTION OF THE INVENTION

Telephone booths are often located in remote areas such as beaches, parks, side roads, rest areas and the like where it is difficult or uneconomical to run electrical power lines to supply dark or night time lighting for the telephone facility. Electrical code requirements in some localities and the cost of electrical power lines, as well as possibly requiring the use of transformers and the like for stepping down the voltage for lighting purposes at the telephone facility, can be quite expensive so there has been a problem in the past in economically supplying electrical energy for lighting purposes at the telephone facility. This lighting problem has been aggravated with the recent massive increase in electric energy costs. While systems using PV arrays or cells for charging storage batteries which are, in turn, used for night time lighting or other purposes, and which may or may not be controlled by light level sensors, have been well known, these have not been applied in the past to telephone booth usage.

The object of the present invention is to eliminate the requirement for electric power lines to supply electrical energy for operating the lamps or electrical equipment for outdoor telephone booths, and, more particularly, to economically incorporate PV arrays, storage batteries, and battery protective charging and control systems to telephone booths. According to the invention, a PV array, which may be mounted in the roof panel of a telephone booth or remote housing unit, or in some preferred situations, on a pole or aerial mast with the PV array being disguised as a sign or including sign indicia as part of the surfaces of the structure. The PV array in the preferred embodiment is constituted by one or more commercially available PV arrays connected electrically in parallel and supplying electrical energy to an electrical storage battery through a battery charge control unit which, in the preferred embodiment is a temperature compensated battery charge control regulator having a thermistor assembly attached thereto for providing a temperature compensated maximum charging voltage limit which matches the manufacturers' suggested limits for battery charging of the 12 volt storage battery to preclude overcharging and possible damage to the battery. If desired, various arrangements of the PV arrays can be used to supply higher or lower voltages. In the preferred embodiment standard commercially available PV arrays, such as the ARCO AS116-2300, are used to charge one or more storage batteries. Moreover, the battery in the preferred embodiment is a conventional 12 volt deep discharge battery which can withstand many discharging and recharging sequences or cycles and is preferably housed in or on the base of the booth.

The circuitry uses of the PV array as an ambient light intensity sensor so as to assure that during daylight hours there is no electrical load connected to the battery and the electrical energy from the PV array is confined to charging the battery.

The choice of storage battery and PV array requires that consideration be given to effects of average daily solar insolation, prolonged periods of low solar insolation, low ambient temperature, coloumbic charging efficiency of the storage battery, and aging effects as well as the total electrical load. In those instances where insufficient solar insolation occasionally occurs over a prolonged period, the battery discharge limit control circuit provides a means to disconnect the load if the storage battery terminal voltage falls below a predetermined safe level. Exceeding the minimum safe discharge level on typical liquid electrolyte batteries shortens battery life and makes the battery electrolyte material susceptible to freezing. User sensing means controls light intensity level by pulse width modulation to conserve energy and extend operation during extended periods of low solar energy and/or darkness.

As noted above, the solar cells themselves are conventional but they may be mounted upon an aerial mast or pole so as to take them out of the reach of vandals and, also, in roadside type installations, locate them above the high dust or dirt level so that they will require less cleaning and maintenance while avoiding deterioration in the performance of the solar cells because of such dirt and dust. In this embodiment, the solar cell structure itself is preferably disguised as a sign so as to direct users to the phone facility from a greater distance. A due South exposure and at an angle suited to the latitude of the installation site is desirable for orientation relative to the path of the sun and for permitting water and dirt to run off. The sign can be a reflective sign and/or even be illuminated by a further fluorescent lamp for directing phone users to that phone facility.

It is contemplated that in a further embodiment the telephone booth will retain the normal fluorescent lamp (typically a circular lamp) and ballast or current limiting means which is powered by an electronic inverter or vibrator connected to the battery for converting and stepping up the 12 volt voltage to 110 volts AC for normal operation of the fluorescent lamp. Of course, the ambient light detector circuitry referred to earlier herein controls power to the inverter which, in turn, powers the fluorescent lamp.

The above and other objects, advantages and features of the invention will become more apparent when considered with the following specification and accompanying drawings herein:

FIG. 1 is a rear perspective view of a telephone booth (the term "booth" as used herein is intended to encompass any outdoor telephone facility requiring electrical lighting) and incorporating the invention, FIG. 2 is a top front perspective view (on a smaller scale than FIG. 1) of a further telephone booth incorporating the invention, FIG. 3 is a schematic diagram of the solar cell, battery charging and lamp circuit incorporating the invention, FIG. 4 is a detailed schematic illustration of the dark-on lamp controller circuitry constituting the electrical switch shown in the block of the fluorescent lamp and dark-on control shown in FIG. 3, FIG. 5 is a block diagram of a preferred embodiment of the invention, and FIG. 6 shows in detail circuit components comprising the block diagram of FIG. 5 including the lamp control power converter.

DETAILED DESCRIPTION OF THE INVENTION

Referring now to FIG. 1, a telephone booth or enclosure 10, (which, in this embodiment is of the type manufactured and sold by the assignee hereof, Galdwin, Inc. of Oakwood, Ga. as model G-2400S-Series Boothette ® walk-up enclosure) incorporating the invention includes a metal base 11 which is mounted on a concrete slab (not shown) through which the telephone lines or wires (now shown) for the facility may be introduced. Alternatively, the telephone lines could come from an aerial drop 8 (as shown in FIG. 2) and run in a wiring channel to the phone. The phone booth itself includes a pedestal 12 which may include a post 13 on the back of the unit through which the wiring channel referred to above may run. The back side of the booth 14 is supported on post 13 and has projecting forwardly thereof transparent side panel 15 and a supporting frame therefor 16. The upper portion of the booth includes translucent dome shaped light panel 17 and illuminated "phone" signs 18 on as many sides as desired. The roof 19 of the phone booth, in this embodiment includes diagrammatically illustrated solar panels 20 which may be connected in series or parallel or combinations of series and parallel as may be desired.

A fluorescent lamp 21, which in this embodiment is illustrated as a circular fluorescent lamp (but which could just as well be straight) and is a standard fixture in this type phone booth, is connected through a pair of wires 22 to a lamp control circuitry. The solar cells 20 themselves are connected through a pair of wires 24 through a battery charge control circuit 25 which, in turn, supplies electrical energy from the solar cell to the battery 26. Battery 26 can be any type rechargeable, long life battery such as a nickel cadmium, but in the preferred embodiment, is a standard 12 volt deep discharge battery which is well adapted for that usage. This is, the charging and discharging cycles and the wide variations in temperature that may be encountered, adapt this type battery well for this usage. In the preferred embodiment this is one or more 12 volt batteries but it will be appreciated that the solar cell(s) can be connected as to provide higher or lower voltages depending upon the requirements of the lamps or other electrical load. Battery 26 is contained in a battery box (not shown) which is within post 12 and on base 11. In the embodiment illustrated in FIG. 1, the output of the battery is supplied through a pair of wires 28 to a conventional battery condition or charge sensor 29 and then through a pair of wires 30 to an inverter 31 which converts the 12 volts DC from battery 26 to 115 volts 60 HZ AC power. This energy is supplied to a standard electrical convenience outlet 32. Battery condition sensor 29 supplies a signal on wires 29s and on the telephone lines to the central office to advise the central office of a fault.

An electrical cord 33 which runs through the wiring channel in the back of the phone booth is wired directly at one side to ballast 23 and through the second side of the AC line to a photosensor control circuit 34 which is connected via wires 35 to receive power from the receptacle 32 and cord 33. Photosensor 34 has a sensing unit 36 which, in a standard location is on the under or shadow side of the booth so as to avoid sensing the light from lamp 21 and hence only operates according to ambient natural light.

As will be described more fully hereafter, the level of ambient light required to actuate the light level sensor can be adjusted by adjusting the dark-on lamp controller circuitry. The dark-on controller circuit constitutes an electrical switch which is connected in series with a second input lead 38 to ballast 23 only upon the ambient light level falling below a selected amount to turn on the fluorescent lamp 21. As indicated earlier, the dark-on controller may include or be constituted by a programmed timer.

With reference now to FIG. 2, an outdoor telephone booth is illustrated in which an aerial mast or pole 40 is used for supporting the line to the booth via the aerial drop 8. In this case, the solar cell mounting structure is constituted by a pair of triangularly shaped end panels, one of which, 47 is illustrated in FIG. 2, the other is on the opposite end and a rear rectangular panel and a base (not shown). The angle of the surface of the PV array is adjusted to optimize the capture of solar insolation at the latitude of each particular installation. The aerial mast 40 serves as a conduit for carrying telephone lines and the wires 24 to the circuitry illustrated in FIG. 3. In this embodiment as well as in the embodiment of FIG. 1, there are two 1 by 4 foot photo voltaic arrays (each including two 1 by 2 panels) to provide 8 square feet of photo voltaic area. These arrays are connected in parallel.

In the embodiment of FIG. 2, the booth or enclosure illustrated is of the type sold under the trademark Boothette ® walk-up enclosure by the assignee hereof. In this case, the fluorescent lamp 21 is constituted by a pair of low voltage, low wattage fluorescent tubes $21'a$ and $21'b$ in a support fixture $21'f$ and are commercially available and widely used in recreational vehicles, camping, boating, etc. Each tube is rated at 12 volts, 8 watts and are used to illuminate the sign panels 18 and a translucent ceiling panel (now shown in FIG. 2). If desired a lamp could also be housed in the PV array mounting structure at the top of post 40 to illuminate sign panels 47. The connections of the elements shown in FIG. 2 are shown in FIG. 3.

With reference to FIG. 3, the PV array is illustrated with a standard designation connected with two photo voltaic arrays $20'1$ and $20'2$ in parallel. It will be appreciated that the symbols illustrated may encompass more than one PV array. The black lead 53 is the positive lead or energized side and the white 51 is the ground side and connected to the ground as illustrated in FIG. 3. Connectors 54 connect the PV array through a charging circuit constituted by a voltage regulator 50, which is commercially available from the Motorola Company (their part No. MSPR 125L) and includes a thermistor assembly 52 which is attached to the regulator to adjust the voltage regulator operation in accordance with the ambient temperature of the regulator so as to assure uniform operation and supply of charging current to battery 26.

As diagrammatically illustrated in FIG. 3, the ambient light sensing circuit is indicated as a switch 60 which is shown in detail in FIG. 4. As shown in FIG. 4, the PV array negative terminal #61 is connected to an adjustable resistor 62 and as shown in FIG. 1 is oriented so as to limit lamp operation to dark hours only. The PV array output is such that light from the lamp will not operate it. The intermediate point 63 between the photoresistor 61 and adjustable resistor 62 is supplied as one input to comparator 64 which is a standard integrated circuit component and marketed under the designation or part No. LM311. A voltage divider constituted by two 10,000 ohm resistors 65 and 66 has its intermediate point 67 connected as the second input to comparator 64 and is the voltage against which the output of the cell 61 is compared to determine the level at which the light will turn on. A capacitor 67 is connected in parallel with the assembly for filtering purposes and a diode 68 couples the 12 volt supply to the voltage divider 65, 66 and the light sensing cell circuit 61, 62. The output of comparator 64 is supplied to a Darlington connected transistor pair 70 and 71, respectively which have their proper bias and operating potentials supplied thereto via a base resistor 72 and a collector resistor 73. The output transistor 71 of the Darlington connected pair actually operates as an electronic switch to couple the 12 volts to the fluorescent lamp pair and the energy consumption by this ambient light sensing circuit is extremely low.

Figure 5:
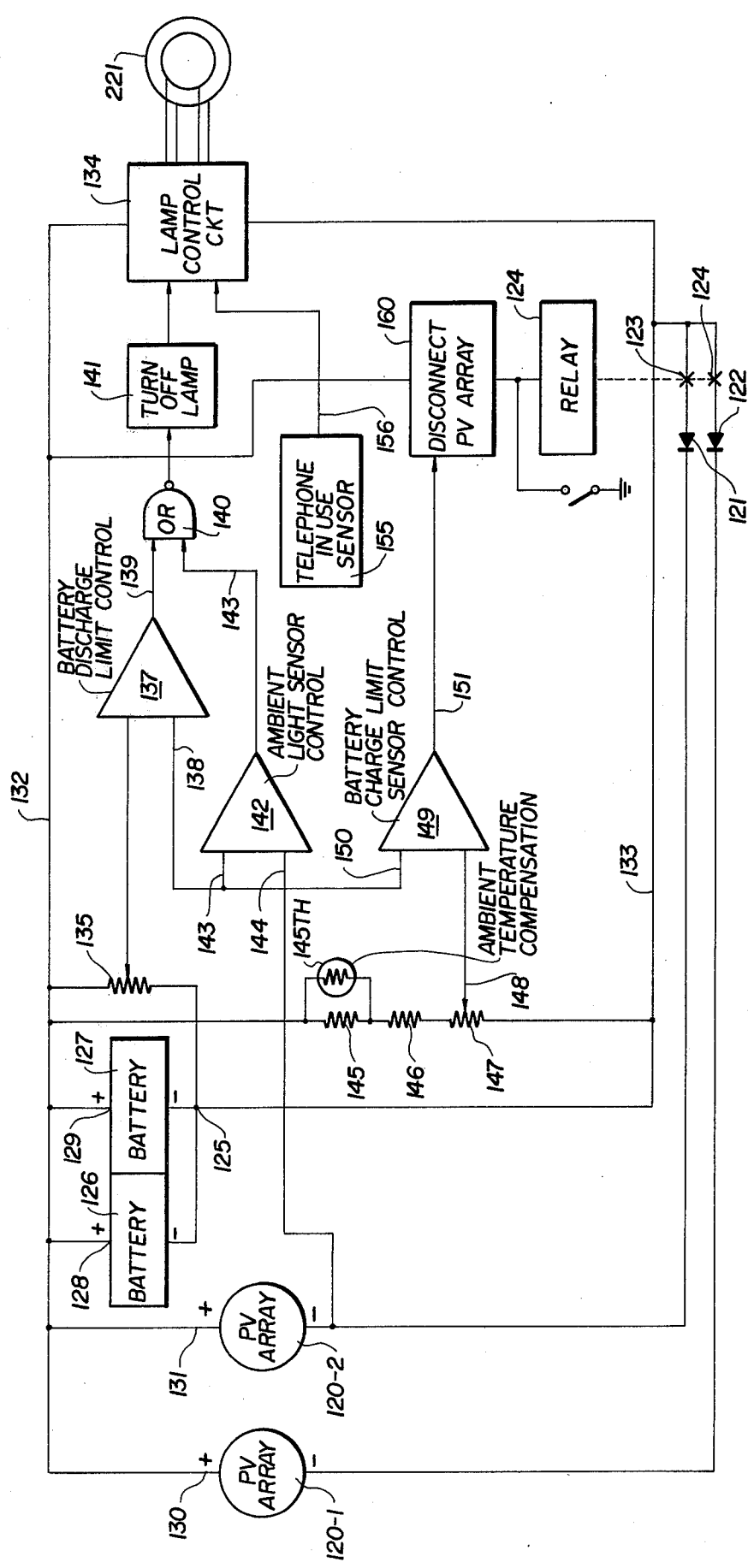
FIG. 5 shows a block diagram for a preferred embodiment for implementation of the photo voltaic lighting for outdoor telephone booths.
Figure 6:
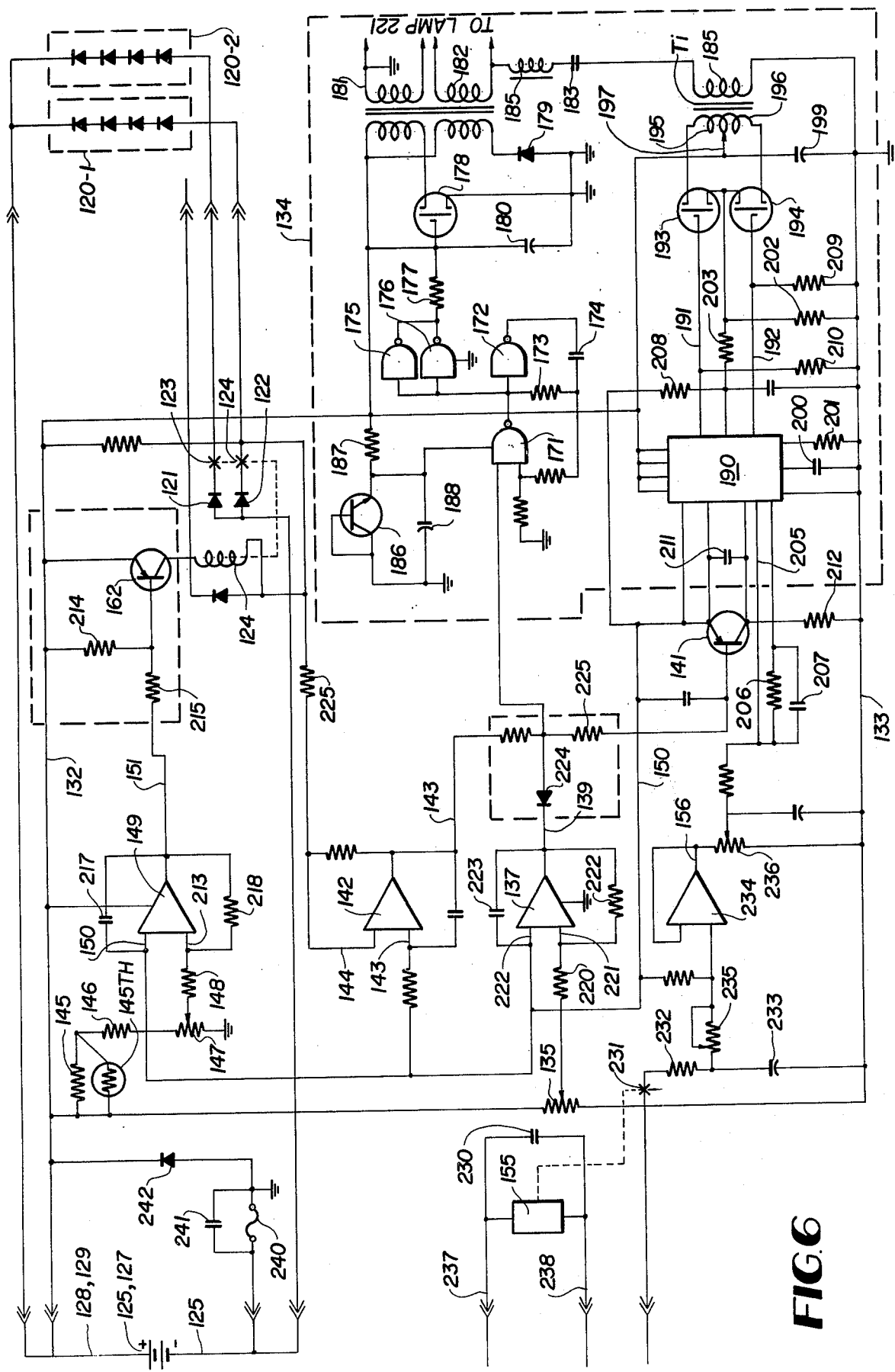
FIG. 6 shows the detailed circuit components comprising the block diagram of FIG. 5 including the lamp control power inverter.

Referring now to a preferred embodiment of the invention as illustrated in block diagram in FIG. 5 and in the detail circuit diagram illustrated in FIG. 6, a pair of photo voltaic arrays 120-1 and 120-2 are connected in parallel through a pair of reverse current blocking diodes 121 and 122 and contacts 123, 124 of disconnect relay 124 to the negative bus or ground terminal 125 of parallel connected batteries 126 and 127, respectively. The positive terminals 128 and 129 of the batteries 126 and 127, respectively, are connected to the positive battery bus 132 and the positive sides 130 and 131 of photocell arrays 120-1 and 120-2, respectively. The positive battery bus 132 and the negative battery bus 133 are coupled to lamp control circuitry 134 which is described more fully hereafter. The charge condition of the battery is developed on potentiometer 135 and supplied to input 136 of comparator 137, and a reference voltage input is supplied to input 138 of comparator 137; the output of this unit functioning to establish a battery discharge limit control signal on output line 139. The reference voltage on input terminal 138 is derived from a reference voltage generator described more fully in connection with FIG. 6. The output signal on line 139 is applied through OR gate 140 which, in turn, supplies control signals to a lamp to turn off control unit 141 (constituted by transistor 141 and described more fully hereafter) which is utilized to control lamp control circuit 134 to turn off the lamp 221 whenever the charge on the batteries 126 and 127 are at such a level that further discharge of the batteries would produce damage.

A second input to OR gate 140 is derived from an ambient light control circuit constituted by comparator 142. Comparator 142 has the reference voltage applied to its input 143 and its second input 144 is coupled directly to one of the photo voltaic cell arrays PV, array 120-2, for example. Thus, since the photo voltaic arrays are sensitive to sun light, they are used according to the invention as ambient light sensors. The output voltage of array 120-2 is compared with the reference voltage and when the panel negative voltage terminal is more negative then the reference voltage, comparator 142 switches to a battery minus voltage indicating that the sun is shining and that the lamp 221 should be off. This provides a signal on line 143 to OR gate 140 which controls transistor switch 141 to switch off the lamp(s). Lamp 221' therefore will turn "on" anytime of the day or night when the ambient light is below a pre-selected level. The selection of the threshold voltage is not critical since the photo voltaic output changes so dramatically at dawn and dusk over a period of a few minutes regardless of the cloud cover.

A voltage divider system, constituted by resistors 145 (which is shunted by ambient temperature compensating thermistor 145TH), resistor 146 and potentiometer 147, is connected between the positive battery bus and negative battery bus 133. The wiper 148 of potentiometer 147 is supplied as one input to comparator 149 and a reference voltage is supplied on input terminal 150. Operational amplifier 149 compares the storage battery voltage signal on wiper 148 (the voltage on wiper 148 varies with the battery voltage) with the stable reference voltage supplied to input 150 and when the battery voltage signal is less than the reference voltage, there is an output signal on line 151 which causes a solid state control element (described in connection with FIG. 6) in the disconnect unit 160 in an effort to energize relay 124. If PV panel 130 is generating an output voltage, relay 124 will energize and, through contactors or switches 124, connect panel array 120-1 to negative battery bus 133 via diode 122. Potentiometer 147 adjusts the battery voltage level at which the output on line 151 of comparator 149 changes state. The combination of resistor 145 and termistor 145TH, resistor 146 and potentiometer 147 provides a $-33$ mv/0° C. temperature coefficient for the threshold voltage. The $-33$ mv/0° C. tracks the manufacturers' suggested specification for the energy storage battery used in this system and obviously can be selected to match any manufacturers' suggested specifications for the energy storage batteries 126 and 127, respectively.

In order to preclude battery degradation, according to the invention, the system is designed such that when the battery coulombic charging efficiency, aging, ambient temperature and system efficiency are considered, actual battery discharge will likely not exceed 40% of available energy over any five day no sun interval (or approximately 80 hours). As described more fully hereafter, this is in part achieved by a user sensing circuit controls the lamp intensity so that when the phone facility is not in use, a lower level of light intensity is produced thereby conserving battery power. It will be appreciated that these limits may be varied according to the battery, the insolation in the area where the unit is located, and like variables.

Comparator 137 compares the battery voltage as derived from potentiometer 135 with the reference voltage on input 138 so that when the battery voltage falls below the desired threshold, an output signal from comparator 137 on line 139 is applied to OR gate 140 which, in turn, controls turn off transistor switch 141 to control lamp control circuitry 134 or terminate the supply of energy to the lamp 21'. As will be discussed more fully hereafter in regard to FIG. 6, lamp control circuitry 134 includes a pair of inverters and current to the inverters is terminated to thereby terminate the supply of energy to the lamp. Total current drain in this condition is less than 0.05 amps.

Figure 2:
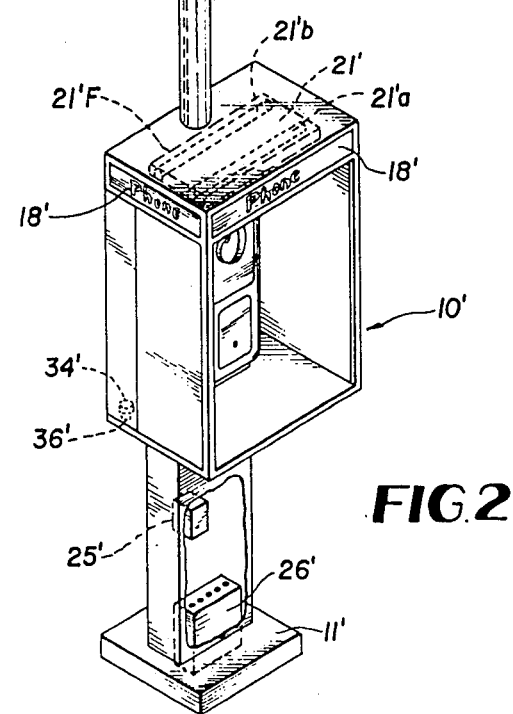
Figure 3:
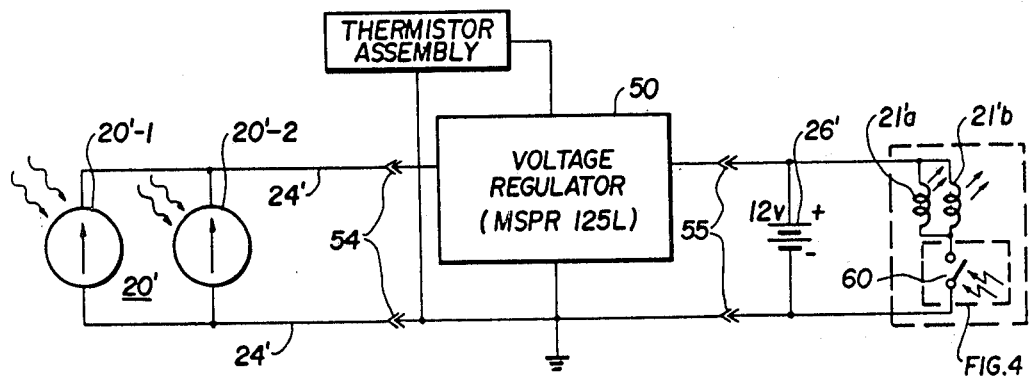
Figure 4:
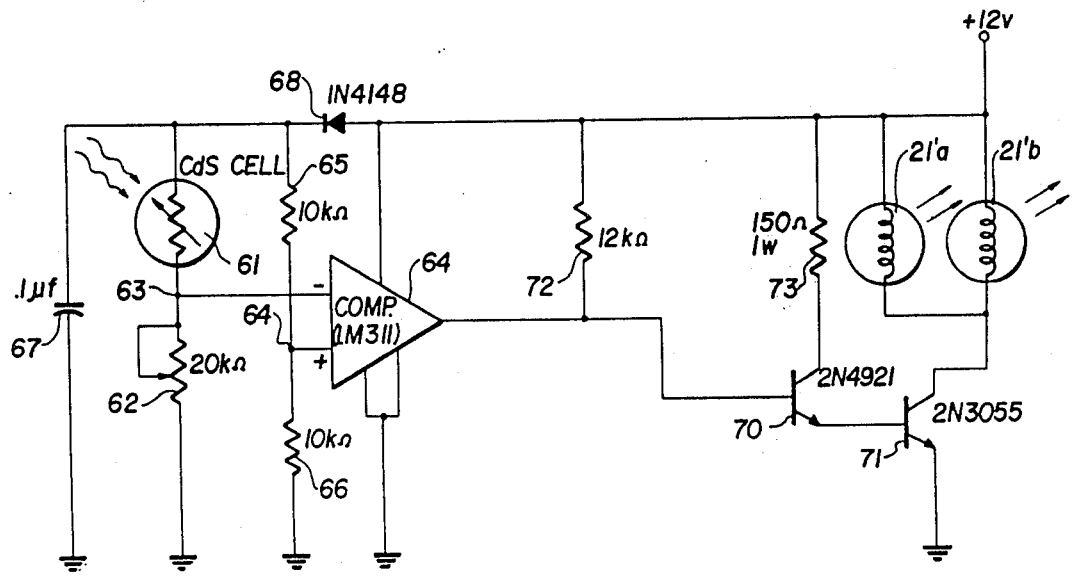

At night time, the standby light intensity, which is relatively low to conserve battery power, may not be sufficient for dialing the telephone or reading instructions or using the telephone directory. Accordingly, a telephone in use sensor 155 senses when the subscriber or telephone user lifts the hand set (see FIG. 2) from the cradle or hook via the ring circuit of the phone line. This provides a signal on output line 156 which is supplied to the lamp control circuitry 134 to cause the lamp intensity to increase to its maximum level until the hand set is returned to the cradle. And, a delay circuit, shown in FIG. 6 maintains the lamp lighted for several seconds after returning the hand set to the hook or cradle.

Figure 1:
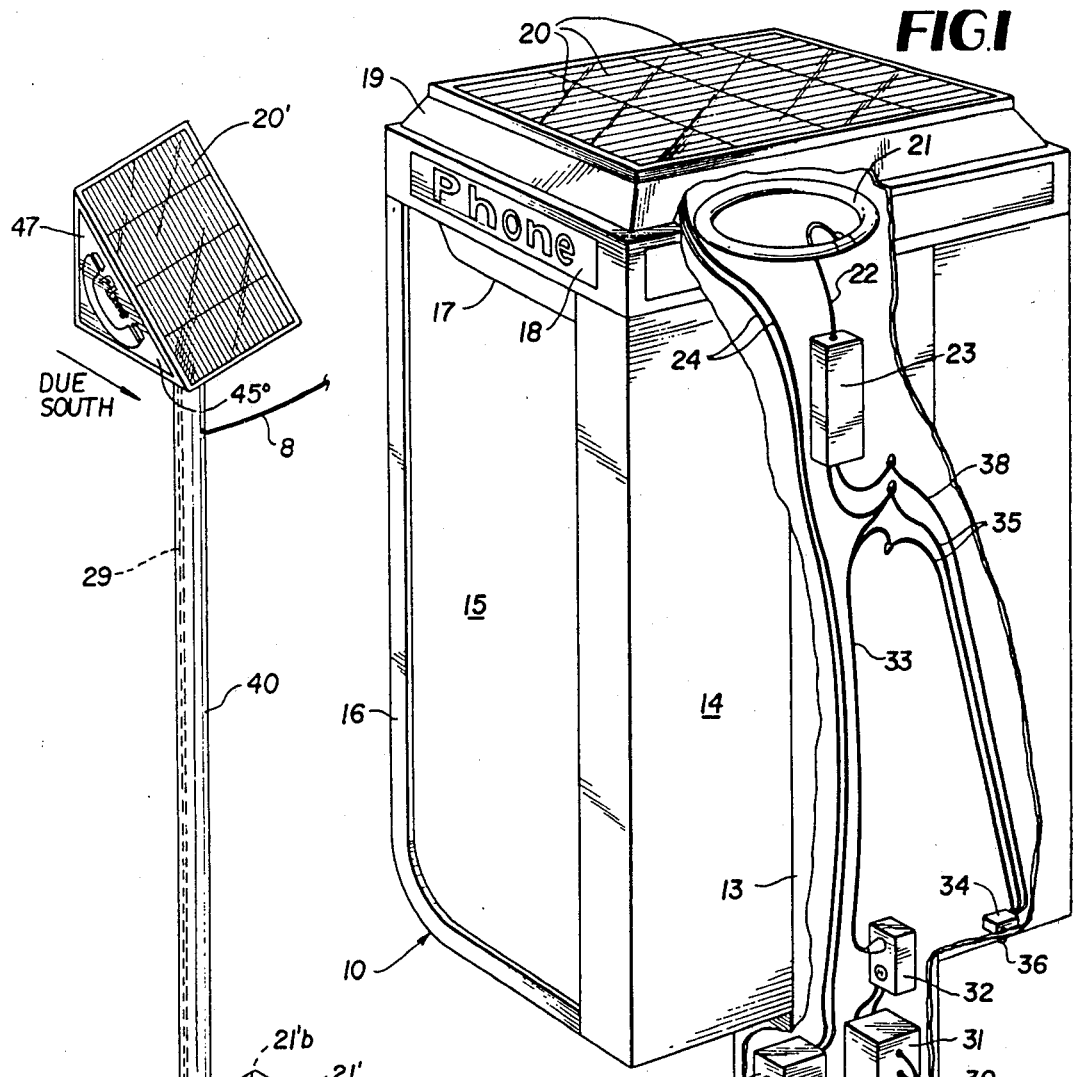

In FIG. 6, the solar or PV panels 120-1 and 120-2 which are in the roof of the booth (FIG. 1) or on the mast 40 (FIG. 2) and the batteries 126, 127 are preferably in the lower most part of the installation and typically in the base 11, and these are connected by connectors as diagrammatically indicated.

The lamp drive and control circuitry includes two power inverters: a free running square wave inverter for energizing the cathodes at the two ends of the fluorescent tube or lamp 21' and a pulse width modulated inverter for providing and controlling the high voltage or discharge voltage of the fluorescent tube of lamp and lamp itensity.

The cathodes (not shown) of the fluorescent tube 221 must be kept hot to illuminate the lamp during cold ambient and lower power standby output conditions. Also, lamp life is significantly reduced if lamp cathodes are not kept hot at all times while the lamp is on. The free running square wave oscillator constituted by inverter amplifier elements 171, 172, resistor 173 and capacitor 174 supply the cathode elements of lamp 221. Resistor 173 and capacitor 174 determine the frequency of operation of the free running oscillator, and this frequency is set at approximately 60 kHz. The output frequency is coupled by parallel connected driver elements 175, 176 through a coupling resistor 177 for driving a HEX-FET transistor 178 which switches current flow through the primaries of output transformer T2 in a "fly-back" configuration. Elements 171, 172 and 175, 176 are the individual circuit elements of an integrated circuit (U-3) the quad operational amplifier No. 3403 by National Semiconductor, Raytheon and others. Diode 179 provides a path for discharging the energy stored in the transformer T2 on each half cycle of oscillation. Capacitor 180 provides a transient energy bypass for transistor 178 and transformer T2. The secondary windings 181 and 182 of transformer T2 have approximately 3.6 volts rms (60 kHz) thereat and drive approximately 10 ohm resistive loads (the cathodes) located within the respective ends of the fluorescent tube or lamp 221. One of the output (181) is ground reference (at its upper end) and the other end is coupled through current limiting capacitor 183 and ballast 185 to the secondary winding 184 of transformer T1, described more fully hereafter, and thus floats at the striking voltage of the fluorescent lamp.

Transistor 186 has its base electrode connected to its emitter and, in conjunction with resistor 187 and capacitor 188, constitute a 7 volt voltage regulator to limit the bias voltage of inverter 171 in the square wave oscillator circuit to an acceptable level even if the system is improperly installed or the storage battery(s) is removed while the photo voltaic panels 120-1 and 120-2 are generating their open circuit terminal voltage.

The striking voltage for the fluorescent lamp 21' is provided by the second inverter in lamp control circuitry 134. This inverter includes a multifunction pulse width controlled modulator control integrated circuit 190 (U-1) as manufactured by Texas Instruments Company as pulse width modulation controlled integrated circuit element No. TL494 as described in Texas Instruments information Bulletin CA198.

Pulse width controlled modulator 190 includes an oscillator which has a pair of outputs on its output leads 191 and 192 which drive HEX-FET transistors 193 and 194, respectively, which, in turn, drive the respective upper and lower halves 195 and 196 of the primary winding of transformer T1, which is a non-saturable core transformer which is required for pulse width modulation and results in further battery energy saving feature since it avoids driving the transistors off with extra pulse energy. Moreover, the high frequency of operation results in smaller, more cost efficient transformers which have lower energy losses. The center tap or common connection 197 of transformer primaries 195 and 196 are commonly connected together and to the positive bus 132. A filter capacitor 199 couples the center point 197 to ground (negative battery bus 133). The frequency of oscillator 190 is determined by capacitor 200 and resistor 201 and is chosen to be above 10 kHz. The output leads 191 and 192 from oscillator 190 alternately drive transistors 193 and 194 into conduction with positive going pulses whose width is a function of the desired current in fluorescent lamp 21. Current flowing in resistor 202, which is coupled to the commonly connected electrodes of transistors 193 and 194 is sensed through isolating resistor 203 by a comparison circuit in the pulse width controlled modulator IC element 190 (U-1).

Resistor 206 and capacitor 207 provide feedback for stability of the internal sense amplifier (a part of U-1) of oscillator 190 and resistors 203 and 209 provide a voltage shift network to allow the oscillator 190 at pin 1 to be direct current biased at a more desirable voltage level. Consult TI information Bulletin CA198 for further internal circuit details of the integrated circuit forming oscillator 190. Resistors 209 and 210 provide a discharge path for the internal capacitances of transistors 193 and 194 to reduce the switching time and therefore improve the efficiency.

As current through the lamp increases the voltage through resistor 202 increases supplying an increased voltage to the input pin 1 of oscillator 190. When this voltage exceeds the internally generated voltage at input 205, the output, currently in the high state, is driven low turning that respective transistor 193 or 194 off. During the next half cycle the alternate output goes high, and the alternate transistor turns on causing current to flow in resistor 202. Again, the current builds until oscillator 190 pin 1 exceeds the reference voltage on line 205 and the alternate output of oscillator 190 is turned off. The duty cycle, or the ratio, is "on" time to "off" time determines the brightness of the lamp for any given battery voltage. Use of a pulse width modulator to supply a fluorescent lamp is per se known in the art. Transistor 141, when conducting, provides a means to turn off oscillator 190. As described elsewhere herein, this occurs when the photo voltaic array detects sunlight or when the storage battery has discharged beyond the safe limit. Capacitor 211 and resistor 212 reduce the in rush current to the lamp 221 at start up.

Transformer T1 is a non-saturating EC core switching transformer with a bi-filar wound push-pull primary (windings 195, 196) and a single high voltage secondary (184) referenced to battery minus bus 133 or ground, and as noted above, results in a further battery energy saving since the transistors 193, 194 are not driven off with extra pulse energy which is wasted.

Operational amplifier 149 (operational amplifiers 137, 142, 149 and 234 are part of a common integrated circuit element U-2 and designated No. CD4011 by several manufacturers, such as Motorola and Fairchild etc.) constitutes the battery charge limit sensing element and this compares the storage battery voltage signal on input line 213 with the stable reference voltage on line 150 (generated at pin 14 of unit 190).

The voltage on line 213 is derived from the voltage divider system connected across the battery plus bus 132 and battery minus bus 133 and constituted by resistor 145 and its parallel connected thermistor 145TH, resistor 146 and potentiometer 147. The voltage on the wiper of potentiometer 147 is coupled by a resistor 148 to input lead 213. The reference voltage at lead 150 is generated within unit 190 and is provided on lead 150 as an output of this unit. The battery voltage as sensed at the wiper of potentiometer 147 and compared against the reference voltage (from unit 190-U1) on line 150 and when the battery voltage is less than the reference voltage there is an output signal from operational amplifier 149 on line 151 to the base of transistor switch 160 which switches to battery minus causing transistor 162 to conduct in an effort to energize the winding 124 of the control relay. If the photo voltaic panel 120-1 is generating an output voltage, coil 124 will energize and connect the photo voltaic panel 120-1 to the battery minus via the battery (minus) conductor through diode 122. Resistor 214 and resistor 215 provide a voltage divider to insure that transistor 162 turns off when comparator 149 is at a battery plus voltage. Capacitor 217 provides a negative feedback around comparator 149 to make it immune to switching noises within the system and resistor 148 and resistor 218 function to set the hysteresis of the switching point to preclude oscillations of comparator 149 output at or near the selected switching voltage. Potentiometer 147 adjusts the battery voltage signal level at which the comparator 149 changes state. The combination of resistors 147, 146 and 145 with termistor 145TH provides a $-33$ mV/0° C. temperature coefficient for this threshold voltage. The $-33$ mV/0° C. tracks the manufacturer's suggested specification for the energy storage battery used in the preferred embodiment. It will be appreciated that this can be adjusted to accommodate the battery specifications whenever desired.

In order to assure long life for the battery (s), the battery discharge must be limited to preclude battery degradation. In accordance with the present invention, when the battery coulombic charging efficiency, aging, ambient temperature and system efficiency, are considered, actual battery discharge likely will not exceed 40% of available energy over any five day no sun (insolation) interval or about 80 hours. Operational amplifier 137 compares the battery voltage picked off by the wiper of potentiometer 135 and coupled through resistor 220 to terminal 221 of comparator 137 with the stable reference voltage at terminal 222. The discharge limit threshold is adjusted by potentiometer 135 and when the battery voltage falls below the desired threshold, an output signal on line 139 is produced (the output line 139 switches to a battery minus) causing both inverters to terminate oscillation. Total current drain in this condition is less than 0.05 amps. Resistors 220 and 222 provide hysteresis similar to resistors 148 and 218. Capacitor 223 provides switching noise immunity and diode 224 couples the negative battery output or signal on line 139 through resistor 225 to the base of transistor 141 to cause transistor 141 to conduct and terminate oscillations of oscillator 190 and, through the same signal being applied to oscillator inverter 171 for the cathodes or heaters to terminate the oscillations of the free running multivibrator.

Since the photo voltaic arrays are sensitive to sunlight they are suitable as ambient light sensors. Thus, the output voltage of solar panel 120-1 is sensed at input line 144 of comparator 142 via resistor 225 and is compared against the stable reference voltage on input line 143. When the panel negative voltage terminal is more negative than the reference voltage, the output on line 143 of comparator 142, the output 143 switches to battery minus voltage constituting a signal indicating that the sun is shinning and that the lamp 121 should be off. The lamp therefore will turn on anytime of the day or night that the ambient light is below a preselected level. This selection of the threshold voltage is not critical since the photovoltaic output changes so dramatically at dawn and dusk over a period of a few minutes regardless of cloud cover.

As noted earlier, the standby light intensity may not be sufficient for dialing the telephone or reading directions so according to the invention, when the user lifts the hand set of the telephone receiver from the cradle, the light intensity is increased. Relay 155 and capacitor 230 form a sensing circuit which is activated when the subscriber lifts the hand set from the cradle. When relay 155 is energized, its contacts 231 are closed connecting resistor 232 to the positive battery terminal to thereby charge capacitor 233 essentially to the battery potential. Operational amplifier 234 has its negative input connected directly to the output so that it serves simply as an isolation coupling unit for this signal. Potentiometer 235 is adjusted to cause the lamp to achieve the desired output level during the "off" hook operation, that is, for maximum high intensity. Potentiometer 236 had been adjusted to cause the lamp to draw less than 0.7 amps in the standby (on hook) condition. Therefore, the adjustment of potentiometer 236 also effects the lamp intensity in the "off" hook condition so therefore this potentiometer 236 must be adjusted for standby current drain in the "on" hook (standby) condition prior to adjusting potentiometer 235. The use of relay 155 and capacitor to 230 and the ring conductor 237, 238 of the phone line meets the FCC 19528 criteria for safety and performance. These same components are used in key telephone systems to monitor loop current and control telephone line key lamps. Affects on loop strength and longitudinal balance are negitable. Voltage breakdown exceed 1000 volts and the leakage resistance exceeds 10 megohms. Other user presence sensing means, such as photo and ultrasonic cells, body heat sensors etc. may be used.

Fuse 240 provides protection against excessive drain from the battery and it is bridged by a raser 241. Diode 242 provides for reverse battery voltage protection. If the battery is connected backwards, diode 242 will conduct and cause the fuse to blow. Diodes 121 and 122 are used to provide isolation between the photo voltaic panels 120-1 and 120-2 and the storage battery 126, 127 during dark ambient conditions.

While the preferred embodiment of the invention has been shown and described in detail, it will be appreciated that various modifications and adaptations thereof will be obvious to those skilled in the art and it is intended to include such modifications and adaptations as come within the spirit and scope of the invention in the appended claims.

What is claimed is:

1. An illumination system for a public telephone facility comprising in combination, an illumination means including one or more fluorescent lamps, a photo voltaic electrical energy generating means, an electrical storage battery means, temperature compensated battery charge controller regulator means for controlling the maximum electrical energy stored in said electrical storage battery means, means for limiting the minimum charge remaining in the storage battery means and preventing operation of said illumination means when said minimum charge is reached, means for detecting the level of ambient light conditions, control circuit means connected to said means for detecting the level of ambient light for causing said one or more fluorescent lamps to be energized from said electrical storage battery means when the ambient light falls below a predetermined level.

2. The invention defined in claim 1 wherein said electrical energy generating means and storage means can be located remotely and still controlled from the controller means located at the telephone facility.

3. A solar lighting system for outdoor telephone booths having limited surface area for collecting solar energy, a photo voltaic array for converting solar energy into electrical energy, a rechargeable deep discharge storage battery for storing electrical energy from said photo voltaic array, temperature compensated charge controller means for controlling the maximum charge permitted on the energy storage means, limiting means for controlling the electrical load to disconnect the load if the battery voltage falls below a predetermined minimum voltage level indicative of remaining battery charge, an electrical illuminations means including at least one fluorescent lamp, means for sensing the ambient light conditions and enabeling the energizing of the electrical illumination means when the ambient light level falls below a predetermined level, and means for converting the DC voltage of the energy storage battery to an AC voltage suitable for energizing the said at least one fluorescent lamp electrical illumination means.

4. The invention defined in claim 3 wherein said charge controller means for controlling the maximum charge includes means for adjusting the limit to adapt to various types of energy storage batteries.

5. The invention defined in claim 3 wherein said limiting means for controlling the electrical load to disconnect the load if the battery voltage falls below a predetermined minimum voltage includes a means for adjusting the limit to adapt to various types of energy storage batteries.

6. A solar lighting system for outdoor telephone booths having limited surface area for collecting solar energy and being accessible by the public, said solar energy collection means including photo voltaic cells, means disguising said photo voltaic cells as a sign to reduce the chances of vandalism and theft and also to enhance the aesthetics of the telephone booth.

* * * * *